United States Patent
Heinzemann et al.

(10) Patent No.: US 12,554,477 B2
(45) Date of Patent: Feb. 17, 2026

(54) COMPUTER-IMPLEMENTED SYSTEM AND METHOD FOR MONITORING THE FUNCTIONALITY OF AN AUTOMATED DRIVING FUNCTION

(71) Applicant: Robert Bosch GmbH, Stuttgart (DE)

(72) Inventors: Christian Heinzemann, Vellmar (DE); Lukas Koenig, Grossbottwar (DE); Michael Hanselmann, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 18/185,806

(22) Filed: Mar. 17, 2023

(65) Prior Publication Data
US 2023/0315433 A1 Oct. 5, 2023

(30) Foreign Application Priority Data
Mar. 30, 2022 (DE) ...................... 10 2022 203 124.5

(51) Int. Cl.
| G06F 8/65 | (2018.01) |
| G06F 8/35 | (2018.01) |
| G07C 5/08 | (2006.01) |

(52) U.S. Cl.
CPC ................. *G06F 8/65* (2013.01); *G06F 8/35* (2013.01); *G07C 5/0808* (2013.01)

(58) Field of Classification Search
CPC ............ G06F 8/65; G06F 8/35; G07C 5/0808
USPC ........................................................ 717/168
See application file for complete search history.

(56) References Cited

U.S. PATENT DOCUMENTS

| 6,907,386 | B1 | 6/2005 | Liggesmeyer | |
| 11,341,847 | B1* | 5/2022 | Beaurepaire | G08G 1/0133 |
| 2010/0010776 | A1* | 1/2010 | Saha | G06Q 10/06 702/181 |
| 2010/0145749 | A1* | 6/2010 | Aiber | G06Q 10/00 705/7.11 |
| 2019/0004526 | A1* | 1/2019 | Soliman | B62D 15/025 |
| 2019/0094877 | A1* | 3/2019 | Smith | B62D 15/024 |

(Continued)

FOREIGN PATENT DOCUMENTS

DE  10 2020 211 710 A1  3/2022

OTHER PUBLICATIONS

Kwiatkowska, M. et al., PRISM, Department of Computer Science, University of Oxford, website archive from Mar. 2022, https://web.archive.org/web/20220328181104/http://www.prismmodelchecker.org/.

(Continued)

*Primary Examiner* — Bradford F Wheaton
(74) *Attorney, Agent, or Firm* — Maginot, Moore & Beck LLP

(57) ABSTRACT

A computer-implemented system for monitoring the functionality of an automated driving function of a vehicle using sensor information from at least one sensor includes a software model of the automated driving function, a sensor performance model for the at least one sensor, a sensor monitoring module, which determines performance parameters and monitors the performance of the at least one sensor, an update module for updating the at least one sensor performance model based on the performance parameters determined, and a model checking module for analyzing an overall model comprising a combination of the software model and the at least one sensor performance model.

8 Claims, 2 Drawing Sheets

(56) References Cited

U.S. PATENT DOCUMENTS

| | | | | |
|---|---|---|---|---|
| 2019/0369636 | A1* | 12/2019 | Nishiyama | G06V 20/59 |
| 2020/0086871 | A1* | 3/2020 | Gotoda | G01S 17/42 |
| 2020/0104609 | A1* | 4/2020 | Clothier | G06V 10/82 |
| 2020/0370920 | A1* | 11/2020 | Ahmed | G01S 13/89 |
| 2020/0372410 | A1* | 11/2020 | Karaletsos | G06N 20/00 |
| 2021/0097147 | A1* | 4/2021 | DeVore | G06F 18/22 |
| 2021/0146941 | A1* | 5/2021 | Okuda | H04W 4/44 |
| 2022/0324467 | A1* | 10/2022 | Alvarez | G08G 1/096725 |

OTHER PUBLICATIONS

NuSMV: A New Symbolic Model Checker, Fondazione Bruno Kessler, website archive from Mar. 2022, https://web.archive.org/web/20220327074550/https://nusmv.fbk.eu/.

Verifying Multi-threaded Software with Spin, website archive from Feb. 2022, https://web.archive.org/web/20220219104441/http://spinroot.com/spin/whatispin.html.

Hensel, C. et al., Storm—A Modern Probabilistic Model Checker, website archive from Feb. 2022, https://web.archive.org/web/20220210082840/https://www.stormchecker.org/.

* cited by examiner

COMPUTER-IMPLEMENTED SYSTEM AND METHOD FOR MONITORING THE FUNCTIONALITY OF AN AUTOMATED DRIVING FUNCTION

This application claims priority under 35 U.S.C. § 119 to application no. DE 10 2022 203 124.5, filed on Mar. 30, 2022 in Germany, the disclosure of which is incorporated herein by reference in its entirety.

BACKGROUND

The disclosure relates to a computer-implemented system and method for monitoring the functionality of an automated driving function of a vehicle that uses sensor information from at least one sensor.

The accuracy of the implementation must be tested as part of the industrial development process of software components of an automated driving function, e.g., behavior planners, fusion algorithms, and other control modules. This evaluation is now normally performed in a test-based manner, wherein, e.g., methods such as simulation-based testing or Replay-HiL (hardware in the loop) solutions are used. However, test-based methods generally do not provide a guarantee that failures are detected or that the software component tested is free of errors.

Techniques and tools for model checking and probabilistic model checking are known from the scientific literature. A model checker checks all possible execution options for the software, or rather a model of the software, against a mathematically precise expressed requirement. It is evaluated whether all of the possible software designs meet the requirement. In this way, it can be mathematically and formally verified whether the software or the model for the software is error-free with respect to the requirement expressed. Noteworthy examples of model checking tools relevant in this context are Spin (http://spinroot.com/spin/whatispin.html) and NuSMV (http://nusmv.fbk.eu/).

Probabilistic model checking takes into account the probability of occurrence or probability distribution of inputs into the software being evaluated. This information about the probabilities can be used to calculate a probability for the accuracy of the software. If the software is able to handle all of the incoming information accurately, the probability of accuracy is 1.0. Examples of probabilistic model checking tools include PRISM (https://www.prismmodelchecker.org/) and STORM (https://www.stormchecker.org/).

All of these model checking tools are generic tools that are not designed for a specific purpose. Such model checking tools are used in the context of the disclosure described hereinafter.

SUMMARY

The verification of software components used for achieving an automated driving function is always based on information collected during the design period of the development process. If the software component to be verified uses sensor information, then only initial sensor performance can be considered in this context. However, it can be assumed that the performance of the sensors will change over the life of a vehicle, e.g., due to aging, damage, or other wear.

Measures for reverification of the vehicle software during vehicle operation are proposed by means of this disclosure. The impact of changes in sensor performance on the accuracy of the vehicle software can thus be evaluated with respect to predefined requirements, thus enabling monitoring of the functionality of an automated driving function in the field. Ultimately, the measures according to the disclosure serve to ensure the safety of automated vehicle operation.

The computer-implemented system according to the present disclosure for monitoring the functionality of an automated driving function of a vehicle that uses sensor information from at least one sensor comprises at least the following:
- one software model of the automated driving function,
- one sensor performance model for the at least one sensor
- one sensor monitoring module that determines performance parameters for the at least one sensor and monitors its performance, and,
- one update module for updating the at least one sensor performance model based on the performance parameters determined, and
- one model checking module for analyzing an overall model, which comprises a combination of the software model and the at least one sensor performance model.

According to the disclosed computer-implemented method for monitoring the functionality of an automated driving function using sensor information from at least one sensor, a software model of the automated driving function and a sensor performance model are provided for the at least one sensor in order to provide the prerequisite for applying a model checking method. In addition, performance parameters are determined for the at least one sensor used to monitor the performance of the sensor. If necessary, the at least one sensor performance model is updated based on the performance parameters determined. An overall model is then generated, wherein the at least one updated sensor performance model is combined with the software model of the automated driving function. This overall model is ultimately analyzed using a model checking process.

According to the disclosure, it has been recognized that model checking methods can not only be used for the initial verification of software components, but also for monitoring the functionality of automated driving functions in the field, i.e., during the operating period of the respective vehicle. In both cases, model checking methods provide formal mathematical verification of whether the automated driving function is providing error-free results with respect to previously expressed requirements. It is particularly advantageous that any degradation of sensor performance occurring over the life of the vehicle is taken into account according to the disclosure, using sensor performance models which are regularly updated. To apply a model checking method, the current sensor performance models are then simply combined with the software model of the automated driving function being monitored. In can in this way be checked with respect to all possible designs of the automated driving function being monitored whether the behavior of said function is still correct when all potential input errors occur, or whether a fault results, e.g., due to degradation of the sensor performance.

All models to which a model checking method can be applied are generally conceivable as a software model for the automated driving function and/or as a sensor performance model. These include both memoryless and condition-based models, e.g.,
- a finite state model (FSM),
- a timed automaton,
- a probable state machine,
- a Markov chain,
- a (partially observable) Markov decision process, or a Petri net,
    or a mixture of several of the aforementioned model types.

Each sensor performance model should describe at least one performance error of one of the sensors that provides input information for the automated driving function being monitored. In the context of the method according to the disclosure, sensor performance models can be used which were created by a human model maker, or also automatically generated sensor performance models, as long as these sensor performance models are automatically updateable based on the performance parameters determined during sensor monitoring. In either case, the respective current sensor performance models are automatically combined with the software model of the automated driving function being monitored and analyzed using a model checking method in order to evaluate, and ideally verify, the correctness of the system at the current time.

With the help of the measures according to the disclosure, the influence of various sensor types on the automated driving function can be considered, wherein inertial sensors and vehicle environment sensors are of particular importance.

An inertial sensor could provide sensor information in the form of the actual sensor signal to the automated driving function, or it could also provide higher value information derived from the sensor signal, e.g. trajectory information. In the case first mentioned, the sensor performance model of the inertial sensor could describe the manufacturing-related sensor performance. If the software component to be verified is provided with higher value information, then the sensor performance model of the inertial sensor could model the reliability of this higher value information.

In the context of automated driving functions, the sensor signals from vehicle environment sensors, e.g., radar sensors, lidar sensors, ultrasonic sensors, microphones, and cameras, are most commonly evaluated in order to detect objects of predefined object classes. Information about the presence of such objects in the vehicle environment is then provided as sensor information. In the latter case, the sensor performance model is advantageously derived from measured probabilities for detecting individual objects of the predefined object classes. Advantageously, environmental influencing factors on sensor performance are also taken into account in this case by generating the at least one sensor performance model based on performance measurements for various characteristics of the influencing factors. Examples of such influencing factors in the context of a vehicle environment sensor include weather conditions, ambient brightness, sun position, or contrast ratios. As a result, conditional probabilities for the sensor errors can be determined, by means of which the behavior of the automated driving function can be more precisely verified under various environmental factors.

According to the present disclosure, the performance of the sensors that provide input information to the automated driving function being monitored is continuously monitored in order to update the corresponding sensor performance models as needed. Advantageously, the current performance of a sensor is compared to its performance at an earlier date, i.e., the performance which the existing sensor performance model was derived from. Updating of this sensor performance model is only performed if the sensor performance has changed significantly in the meantime. In the latter case, the sensor performance model is updated depending on a comparison between the current performance of the sensor and its performance at an earlier time point.

As previously mentioned, the analysis of the overall model according to the disclosure using a model checking method provides mathematical verification of, e.g., whether the automated driving function is meeting the predefined criteria for all designs possible. If this is not the case, then the analysis by model checking in an advantageous embodiment of the method provides at least one example of non-fulfillment of these criteria. This proves to be particularly advantageous regarding the choice of suitable prevention measures.

In one preferred embodiment of the disclosure, a probabilistic model checking method for analyzing the overall model is used. In this case, probabilities are determined based on the at least one sensor performance model that the automated driving function being monitored is providing correct results. In this method variant, the model checking method also checks for all possible automated driving function designs as to whether their behavior is still correct when all possible input errors occur, i.e., whether the automated driving function is meeting the predefined requirements or criteria, or whether a fault results. In the latter case, the information about the probability and/or distribution function of the input errors is utilized to calculate the probability of the automated driving function producing a correct result.

Advantageously, the system according to the disclosure further comprises an evaluation module for evaluating the result of the overall model checking analysis, which, depending on the result, enables the control of further vehicle modules. If a potential malfunction of the automated driving function is detected, then this can be signaled to the driver, e.g., by controlling an acoustic or visual signal/display device. Alternatively or additionally, the brake system can also be controlled, e.g., to reduce the vehicle speed and, if necessary, to cause the vehicle to stop.

A particular advantage of the system according to the disclosure is its modular structure, which enables the individual modules to be implemented on the vehicle side, but also enables an outsourcing of individual modules into a central or local server system, or into a cloud system external to the vehicle.

Whereas the sensor monitoring module of the sensors positioned in and/or on the vehicle is preferably implemented on the vehicle side, the software model of the automated driving function, the at least one sensor performance model, the update module, and the model checking module can each be implemented on their own, either internal or external to the vehicle. The individual variants will be explained in greater detail below in combination with the figures.

BRIEF DESCRIPTION OF THE DRAWINGS

Advantageous embodiments and further developments of the disclosure are discussed hereinafter with reference to the drawings.

DETAILED DESCRIPTION

Figure 1:
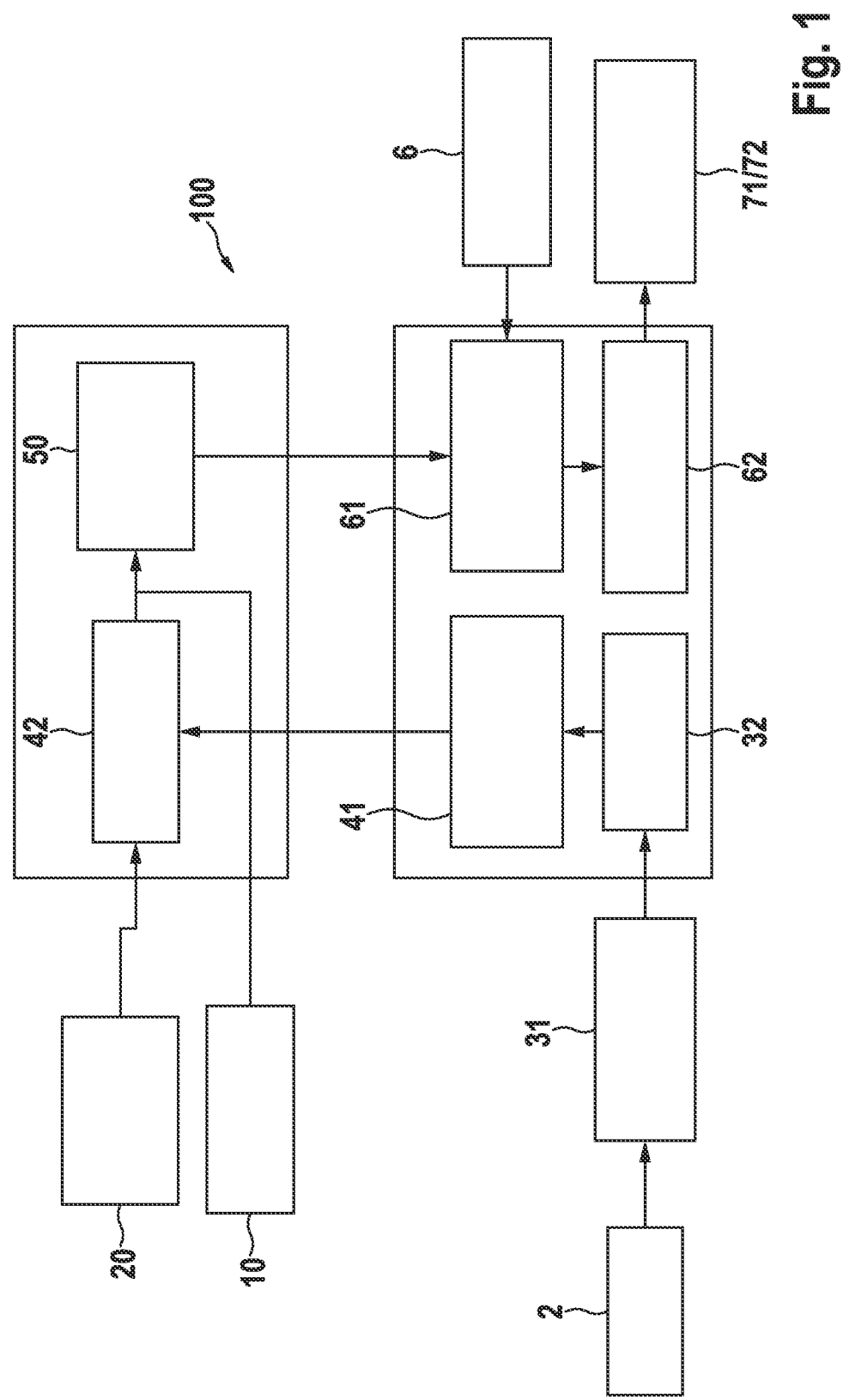
FIG. 1 shows the block diagram of a system 100 according to the disclosure for monitoring the functionality of an automated driving function of a vehicle.

The computer-implemented system 100 shown in the form of a block diagram in FIG. 1 comprises a software model 10 of the automated driving function being monitored according to the disclosure. The driving function being monitored uses sensor information of at least one sensor 2. For example, the automated driving function could be a behavior planner that evaluates sensor information from a camera or at least one other vehicle environment sensor. For purposes of overview, only one sensor 2 is shown in this case. However, it is obvious that the system 100 according to the disclosure could also be taken into account for several similar, or also different, sensors 2. Furthermore, for each sensor 2, the system 100 includes a sensor performance model 20 that describes the performance of the respective sensor based on measurable performance parameters. It is essential that the software model 10 of the driving function being monitored and the sensor performance model 20 can be combined, so that the resulting overall model can be analyzed using a model checking method. As long as this prerequisite is satisfied, both memoryless and condition-based models are conceivable for implementation of the software model 10 and the sensor performance model 20, e.g., a finite state model (FSM), a timed automaton, a probable state machine, a Markov chain, a (partially observable) Markov decision process, a Petri net, or also a mixture of several of the aforementioned model types.

According to the present disclosure, the system 100 comprises a sensor monitoring module consisting of two components 31, 32 in the illustration selected in this case, i.e., a first sensor monitoring module component 31 for determining performance parameters and a second sensor monitoring module component 32 for monitoring sensor performance. The performance parameters are determined by calculating performance metrics, wherein essentially any desired metrics for time-of-flight assessment of a perception function can be used. Sensor performance monitoring is performed by comparing the current performance parameters with the performance parameters determined at an earlier time point. Values can also be aggregated and analyzed over a longer period of time. By means of, e.g., threshold value considerations, it can be easily determined whether the sensor performance has changed significantly. In the latter case, the sensor performance model 20 is updated. An update module is provided for this purpose, which also consists of two update module components 41, 42 in the illustration selected in this case. Based on the performance parameters determined, the first update module component 41 of the update module estimates new model parameters for the sensor performance model 20 or the change of the present model parameters of the sensor performance model 20. The updating of the sensor performance model 20 is then based on this estimate using the second update module component 42 of the update module.

Finally, the system 100 according to the present disclosure also comprises a model checking module 50, which combines the software module 10 of the automated driving function being monitored and the updated sensor performance module 20 into an overall system, and then analyzes this overall system using a model checking method.

The result of this analysis is provided to an evaluation module 61, 62, which can evaluate the result based on, e.g., predefined limits for the safety of the automated driving function 6 (the evaluation module component 61) and, depending on the result, control other vehicle functions depending on the result (the evaluation module component 62). any safety problems can then be signaled by controlling an acoustic or optical display device 71. However, active driving operation can also be engaged, e.g., by actuating the brake system 72.

In FIG. 1, the sensor monitoring module component 32, which monitors sensor performance, and the component 41, which estimates the change in model parameters of the sensor performance model, and the two analysis module components 61, 62 are combined into a first subsystem A. The update module component 42 performing the update of the sensor performance model 20 and the model checking module 50 are combined into a second subsystem B.

The performance parameters of the sensor 2 determined continuously or periodically by the sensor monitoring module component 31 serve as input data for subsystem A. The new model parameters of the sensor performance model 20 estimated by the update module component 41 are transferred from subsystem A to subsystem B, for which purpose each transmission type and technical implementation can generally be used.

The software model 10 of the automated driving function being monitored and the sensor performance model 20 are also required as input data for the subsystem B. Advantageously, models are used in this case which were already created during the design period for the automated driving function and were used as part of the verification process.

The model parameters of the sensor performance model are automatically updated using the update module component 42, i.e., in subsystem B and based on the information obtained from subsystem A. The resulting updated sensor performance model is automatically merged into the model checking module 50 comprising the software model 10 of the automated driving function to form an input for a (probabilistic) model checking tool. The resulting overall model is then verified by the (probabilistic) model checking tool. The result of this analysis is then transferred back to subsystem A.

In subsystem A, the result is evaluated for adherence to limits established during the design period for the safety of the automated driving function. Advantageously, this evaluation provides a multivalued result. In this case, in addition to the usual results of "satisfied" and "violated", several intermediate values can also be output, which can, e.g., express "nearly violated" in order to enable a gradual reaction by the vehicle. If the evaluation yields any result other than "satisfied", then a safety problem is signaled. Said signaling can take place in varying degrees. In one possible realization, the vehicle controller can be signaled directly and then react to this signal with a degradation/restriction of its operating space, or by autonomous removal from service. In a further possible manifestation, an alert can be displayed to a driver or occupant via the user interface (HMI) of the vehicle. In a further possible manifestation, the fleet operator can be signaled so that they can react to the problem.

Several possible manifestations for implementing subsystems A and B are described hereinafter.

In a first preferred manifestation, subsystem A is operated within a vehicle, while subsystem B is operated in a cloud system or other type of server system or data center. Communication between subsystems A and B is in this case performed using wireless communication technology.

In a second preferred manifestation, subsystem A is operated within the vehicle, while subsystem B is operated in a local road-side unit. In this case, communication between subsystems A and B is again performed using wireless communication technology.

In a third preferred manifestation, subsystem A is operated inside the vehicle, while subsystem B is operated in a diagnostic system, e.g., in a workshop. The verification in this manifestation is performed during a workshop visit, e.g., as part of an annual inspection or main inspection. Communication between subsystems A and B can in this manifestation occur both wirelessly and via a connected cable to which subsystems A and B are electrically connected.

In a fourth preferred manifestation, subsystem A and subsystem B are both operated inside the vehicle, potentially in different control units or in the same control unit. In the first case, communications between subsystems A and B can occur via, e.g., an existing vehicle BUS system or a dedicated wired or wireless connection.

In a fifth preferred manifestation, the sensor performance models required for subsystem B as an input are stored as well as the software model of the automated driving function in the vehicle. The update module component 42, which updates the present sensor performance model 20, is part of subsystem A in this manifestation. The merging of the software model 10 of the automated driving function with the updated sensor performance model 20 is also performed on the vehicle side in subsystem A. The complete and merged overall model is then transferred to subsystem B for verification, and only the model checking step is performed in subsystem B. In this manifestation, subsystem B is a generic (cloud) service that has no specific knowledge of the models used. In a variant of this manifestation, the individual submodels, i.e., the updated sensor performance models 20 and the software model 10, are transmitted individually to subsystem B and only assembled there into an overall model.

Figure 2:
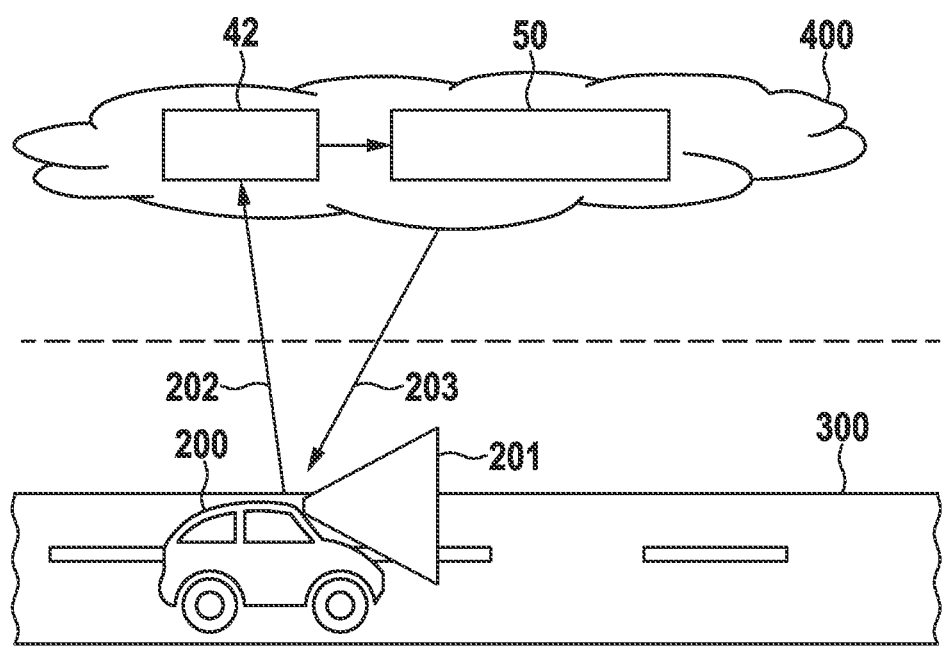
FIG. 2 illustrates the interplay of the individual modules of a system according to the present disclosure and their implementation inside and external to a vehicle 200 using a schematic representation of a vehicle 200 on a roadway 300.

The implementation of portions of the system 100 according to the present disclosure inside and external to a vehicle 200 is also illustrated again in FIG. 2.

According to the illustration in FIG. 1, the system for monitoring an automated driving function also consists of two subsystems in this case: Subsystem A is located in vehicle 200, subsystem B is achieved in a cloud system 400 or in any other form of backend system, data center, edge computing, compute clusters, etc. external to the vehicle 200.

With the help of sensors, the vehicle 200 during operation continuously senses information about the environment around the vehicle (in this case, e.g., while driving on a road 300), which is illustrated in FIG. 2 by a reception area 201. Performance parameters for the individual sensors are also determined regularly or via user initiation in order to monitor and evaluate the performance or function of the sensors. The model parameters of the respective sensor performance models are known to the vehicle 200 and are updated based on the currently determined performance parameters. This is performed on the vehicle side.

The updated model parameters are transmitted to the cloud system 400, as indicated by an arrow 202. The sensor performance models and the software model of the automated driving function are located in the cloud system 400. The sensor performance models are updated in the update module component 42 in the cloud system 400, based on the model parameters updated by the vehicle. The software model of the driving function being monitored is then merged into the model checking module 50 with the updated sensor performance models so that the overall model can also be finally analyzed or verified in the cloud system 400 using a model checking tool or a probabilistic model checking tool. It should at this point be noted that an analysis or verification step is in this case advantageously repeated, which step was already applied to the software model of the automated driving function during the design period in combination with initial sensor performance models.

Arrow 203 illustrates that the result of this analysis is reported by the cloud system 400 back to the vehicle 200. The result indicates whether the automated driving function is also functioning correctly based on the current sensor performance, i.e., meeting predefined requirements, in particular safety requirements. In the case of probabilistic model checking, a probability that the automated driving function is still providing correct results is also transferred. This information can be used in the vehicle 200 to evaluate safety and to take appropriate action in the event of insufficient or borderline safety, e.g., signaling to the driver or also other occupants, signaling to the fleet operator, immediate and independent removal from service, etc.

The above explanations show that the measures according to the disclosure can be used during the operation of an autonomous vehicle in order to monitor its functionality, and in particular its safety, while taking into account the current state of the vehicle sensor means. As described above, the system according to the disclosure can be divided into two subsystems, which can generally be achieved independently of one another: One subsystem A, which is operated within an autonomous system, i.e. onboard the vehicle, and one subsystem B, which is operated in a cloud system. Subsystem A can be used in all types of partially or fully automated vehicles that adjust their behavior based on erroneous sensor information or other environmental information. This relates in particular to driver assistance systems, highly automated driving functions, robots, aircraft controls, autonomous ships, etc. Subsystem B can operate in all types of data centers, cloud systems, edge computing systems, or the like, which can communicate with several vehicles via a communication interface.

The invention claimed is:

1. A system for monitoring a functionality of an automated driving function of a vehicle in which the system uses sensor information from at least one sensor, the system comprising:
a processing system having at least one processor configured to:
determine current performance parameters of the at least one sensor and continuously monitor a current performance of the at least one sensor;
update at least one current sensor performance model for the at least one sensor based on the current performance parameters depending on a comparison between the current performance parameters of the at least one sensor and prior performance parameters of the at least one sensor at an earlier time when the current performance model was derived, the at least one current sensor performance model describing a probability or distribution of performance errors of the at least one sensor;
generate an overall model by combining the at least one updated sensor performance model with a software model of the automated driving function, the software model of the automated driving function describing the functionality of the automated driving function;
analyze the overall model using a model checking process to verify that the automated driving function can provide error-free results with the current performance parameters of the at least one sensor, including at least one of (i) verifying that the automated driving function satisfies predefined criteria or (ii) identifying at least one violation of the predefined criteria by the automated driving function; and
control, immediately, at least one of a display device and at least one vehicle function based on determining that the automated driving function cannot provide error-free results with the current performance parameters of the at least one sensor.

2. The system according to claim 1, wherein the at least one processor includes at least one of (i) a processor in the vehicle and (ii) a processor of a server.

3. The system according to claim 2, wherein the processor in the vehicle is configured to determine the current performance parameters of the at least one sensor and monitor the current performance of the at least one sensor.

4. The system according to claim 2, wherein the processor of the server is configured to at least one of (i) implement at least one of the software model of the automated driving function, (ii) implement the at least one current sensor performance model, (iii) update the at least one sensor performance model, and (iv) analyze the overall model using the model checking process.

5. The system according to claim 1, wherein the software model is at least one of a finite state model, a timed automaton, a probable state machine, a Markov chain, a Markov decision process, or a Petri net.

6. A computer-implemented method for monitoring a functionality of an automated driving function of a vehicle in which the method uses sensor information from at least one sensor, the method comprising:
    determining current performance parameters of the at least one sensor and continuously monitoring a current performance of the at least one sensor;
    updating at least one current sensor performance model for the at least one sensor based on the current performance parameters depending on a comparison between the current performance parameters of the at least one sensor and prior performance parameters of the at least one sensor at an earlier time when the current performance model was derived, the at least one current sensor performance model describing a probability or distribution of performance errors of the at least one sensor;
    generating an overall model by combining the at least one updated sensor performance model with a software model of the automated driving function, the software model of the automated driving function describing the functionality of the automated driving function;
    analyzing the overall model using a model checking process to verify that the automated driving function can provide error-free results with the current performance parameters of the at least one sensor, including at least one of (i) verifying that the automated driving function satisfies predefined criteria or (ii) identifying at least one violation of the predefined criteria by the automated driving function; and
    controlling, immediately, at least one of a display device and at least one vehicle function based on determining that the automated driving function cannot provide error-free results with the current performance parameters of the at least one sensor.

7. The method according to claim 6, wherein the analyzing of the overall model includes using a probabilistic model checking method that comprises determining probabilities that the automated driving function is meeting the predefined criteria.

8. The method according to claim 6, wherein the software model is at least one of a finite state model, a timed automaton, a probable state machine, a Markov chain, a Markov decision process, or a Petri net.

* * * * *